(12) United States Patent
Miura (10) Patent No.: US 6,518,561 B1
(45) Date of Patent: Feb. 11, 2003

(54) USER DETECTION CIRCUIT WITH ENVIRONMENTAL LIGHT DETECTOR

(75) Inventor: Shinichiro Miura, Kanagawa (JP)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 09/704,146

(22) Filed: Nov. 1, 2000

(30) Foreign Application Priority Data

Nov. 5, 1999 (JP) .......................................... 11-314991

(51) Int. Cl.[7] ................................................ H01J 40/14
(52) U.S. Cl. ................................ 250/221; 250/214 AL
(58) Field of Search ............................. 250/221, 222.1, 250/208.2, 208.4, 214 B, 214 AL; 340/555, 556, 557; 345/48, 52, 102, 207; 713/324, 321

(56) References Cited

U.S. PATENT DOCUMENTS

| | | | | |
|---|---|---|---|---|
| 4,247,767 A | * | 1/1981 | O'Brien et al. ............. | 250/221 |
| 4,986,662 A | * | 1/1991 | Bures .......................... | 250/221 |
| 4,988,983 A | * | 1/1991 | Wehrer ........................ | 250/221 |
| 5,355,149 A | * | 10/1994 | Casebolt ...................... | 250/221 |
| 5,491,332 A | * | 2/1996 | Inbar et al. .................. | 250/221 |
| 6,359,270 B1 | * | 3/2002 | Bridson ....................... | 219/679 |

* cited by examiner

Primary Examiner—Robert H. Kim
Assistant Examiner—Chih Cheng G Kao
(74) Attorney, Agent, or Firm—Jay H. Maioli (57) ABSTRACT

A user sensor allows a phototransistor to receive infrared rays that are emitted from an infrared diode in front of a display apparatus and reflected from a user, and a detection signal in response to a quantity of light is inputted to the positive input terminal of a correction circuit formed by a differential amplifier. An illumination sensor receives light in the environment of the display apparatus, and a detection voltage in response to the quantity of light is divided and inputted to the negative input terminal of the correction circuit. The quantity of infrared rays that are included in the environmental light detected by the illumination sensor is subtracted from the infrared rays that enter the user sensor, providing a correct sensor output representing a state of user detection.

5 Claims, 6 Drawing Sheets

USER DETECTION CIRCUIT WITH ENVIRONMENTAL LIGHT DETECTOR

BACKGROUND OF THE INVENTION

The present invention relates to a user detection circuit for a display apparatus that switches between the normal operation and the power-saving standby operation (hereinafter referred to as standby operation) of the display apparatus by detecting a user in front of the display screen.

Recently, a flat-panel display apparatus such as a liquid crystal display apparatus has been drawing attention as a display apparatus alternative to the CRT. In addition, energy conservation is required of OA equipment in general including this type of display apparatus. Therefore, a flat-panel display apparatus is required to save energy by suspending display and switching itself to standby operation to stand by when display is not necessary.

As a method for automatically switching between normal operation and standby operation in this type of display apparatus, there is a method conceivable in which a user in front of the display screen is detected by a sensor, and the apparatus is switched to standby operation if the user is absent for a certain period of time.

Figure 7:
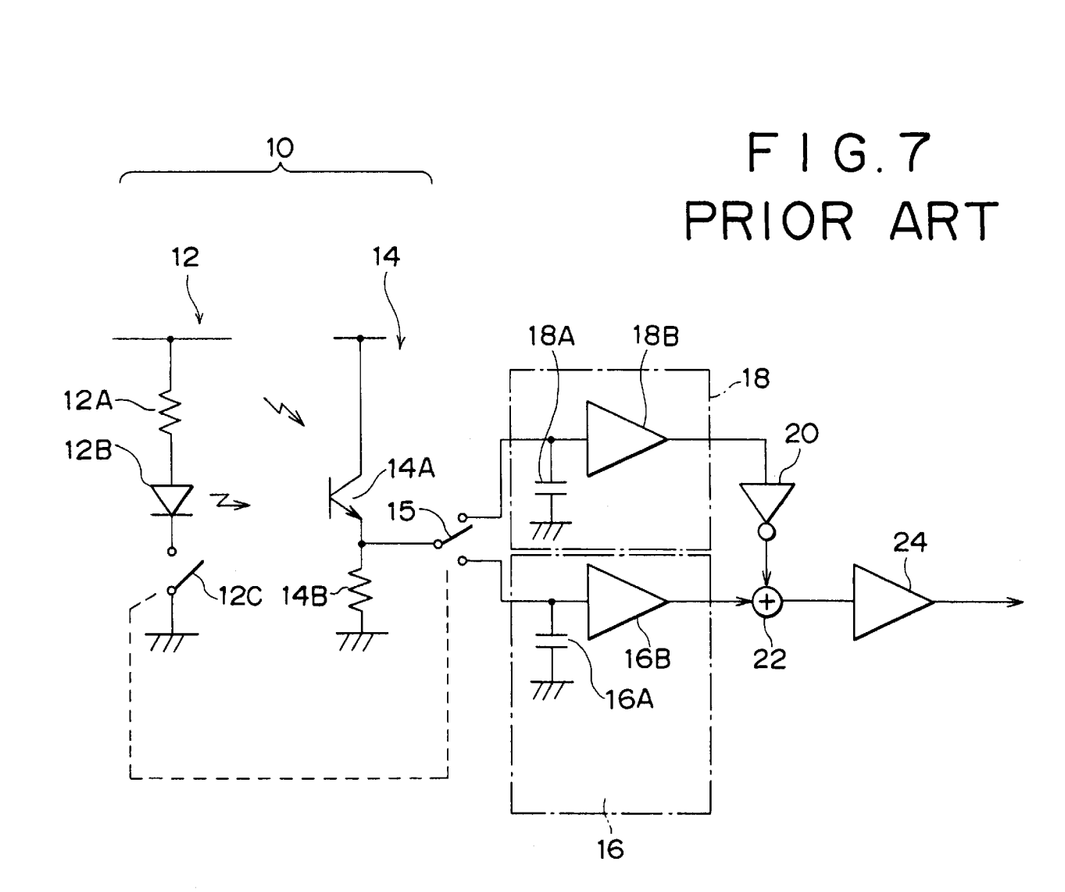
FIG. 7 is a configuration block diagram of a conventional user detection circuit as a prior art for a display apparatus.

FIG. 7 is a circuit diagram showing a concrete example of such a user detection circuit as a prior art.

A sensor 10 for detecting a user (hereinafter referred to as a user sensor) is a reflection type infrared sensor having a light emitting unit 12 and a light receiving unit 14.

The light emitting unit 12 has a resistance 12A, an infrared diode 12B, and a switch 12C, and emits infrared rays from the infrared diode 12B to the front of a display apparatus.

On the other hand, the light receiving unit 14 has a phototransistor 14A and a resistance 14B. The phototransistor 14A receives the infrared rays which are emitted from the infrared diode 12B of the light emitting unit 12 and reflected from the user, and then a detection signal in response to the quantity of light is outputted.

However, although in such a user sensor 10, the phototransistor 14A has frequency characteristics to detect infrared rays, it is difficult for the phototransistor 14A to distinguish between the light reflected from the user and infrared rays included in the light in the environment that also enter the phototransistor 14A. This may cause erroneous function.

As a measure to deal with this problem, the infrared diode 12B is conventionally made to provide pulsed lighting by turning on and off the switch 12C of the light emitting unit 12, so that a lighting time period and the other time period are each detected by a sample hold circuit consisting of a switch 15 and hold circuits 16 and 18. Then only a reflected component is extracted by subtracting an environmental light component.

Specifically, in FIG. 7, the switch 12C in the light emitting unit 12 and the switch 15 on the side of the light receiving unit 14 open and close with pulse periods in sync with each other. That is, when the infrared diode 12B in the light emitting unit 12 is turned on, the output of the phototransistor 14A in the light receiving unit 14 is inputted to a first hold circuit 16. When the infrared diode 12B in the light emitting unit 12 is turned off, the output of the phototransistor 14A in the light receiving unit 14 is inputted to a second hold circuit 18.

The first hold circuit 16 has a capacitor 16A and a buffer circuit 16B. The capacitor 16A accumulates detection voltage from the phototransistor 14A during a time period when the infrared diode 12B turns on, and then the level of the resulting voltage is outputted via the buffer circuit 16B.

The second hold circuit 18 has a capacitor 18A and a buffer circuit 18B. The capacitor 18A accumulates detection voltage from the phototransistor 14A during a time period when the infrared diode 12B is turned off, and then the level of the resulting voltage is outputted via the buffer circuit 18B.

Therefore, sample hold output from the first hold circuit 16 corresponds to a quantity of infrared rays representing a total of infrared rays reflected from the user and infrared rays from environmental light. Sample hold output from the second hold circuit 18 corresponds to a quantity of infrared rays that does not include infrared rays reflected from the user but includes only infrared rays from environmental light.

Thus, the polarity of the sample hold output from the second hold circuit 18 is reversed by a reversing circuit 20, and then the resulting sample hold output from the second hold circuit 18 is added to the sample hold output from the first hold circuit 16 by an adding circuit 22. A resultant signal is outputted as a sensor output signal via an amplifier 24.

This makes it possible to provide sensor output that corresponds only to a quantity of infrared rays emitted from the light emitting unit 12 and reflected from the user without being affected by increases or decreases in the quantity of environmental light. Then, presence or absence of the user in front of the display apparatus is detected by determining the level of the sensor output using a determination circuit.

In the conventional user detection circuit as described above, however, the operation of the switch 12C in the user sensor 10 needs to be synchronized precisely with the operation of the switch 15 on the side of the light receiving unit 14 by a timing circuit (not shown in the figure) for controlling the switches.

In addition, switching noise should not be mixed into the capacitors 16A and 18B.

Thus, the conventional user detection circuit described above has a complex circuit configuration. Moreover, attention needs to be paid to the arrangement of components and further to the capacities and temperature characteristics of the capacitors 16A and 18B.

SUMMARY OF THE INVENTION

Therefore, an object of the present invention is to provide a user detection circuit for a display apparatus that makes it possible to perform highly accurate user detection with a simple configuration without using a highly accurate, complex timing circuit or sample hold circuit.

According to the present invention, in order to achieve the above object, there is provided a user detection circuit that detects absence of the user in front of the display screen and thereby switches the normal operation of the display apparatus to power-saving standby operation for allowing the display apparatus to suspend display and standby. The user detection circuit includes a user sensor for detecting a user in front of the display screen, an illumination sensor for detecting the brightness of the environment of the display screen; a correction means for correcting a detection signal of the user sensor based on a detection signal of the illumination sensor, and a determination means for determining whether the user is present based on the detection signal of the user sensor corrected by the correction means.

In the user detection circuit according to the present invention, the user sensor detects a user in front of the display screen, while the illumination sensor detects the brightness of the environment of the display screen.

The correction means corrects a detection signal of the user sensor based on a detection signal of the illumination sensor. The determination means determines whether the user is present based on the detection signal of the user sensor corrected by the correction means.

Thus, in the user detection circuit according to the present invention, conventional sample hold operation by time division is not required because detection signals are corrected by using a user sensor and an illumination sensor that are independent of each other. Hence a highly accurate, complex timing circuit or sample hold circuit for the above sample hold operation is not required.

It is thus possible to perform highly accurate user detection with a simple configuration, and therefore correctly switch between the normal operation and the standby operation of the display apparatus.

The above and other objects, features and advantages of the present invention will become apparent from the following description and the appended claims, taken in conjunction with the accompanying drawings in which like parts or elements denoted by like reference symbols.

PREFERRED EMBODIMENTS OF THE INVENTION

Preferred embodiments of a user detection circuit for a display apparatus according to the present invention will now be described.

Figure 1:
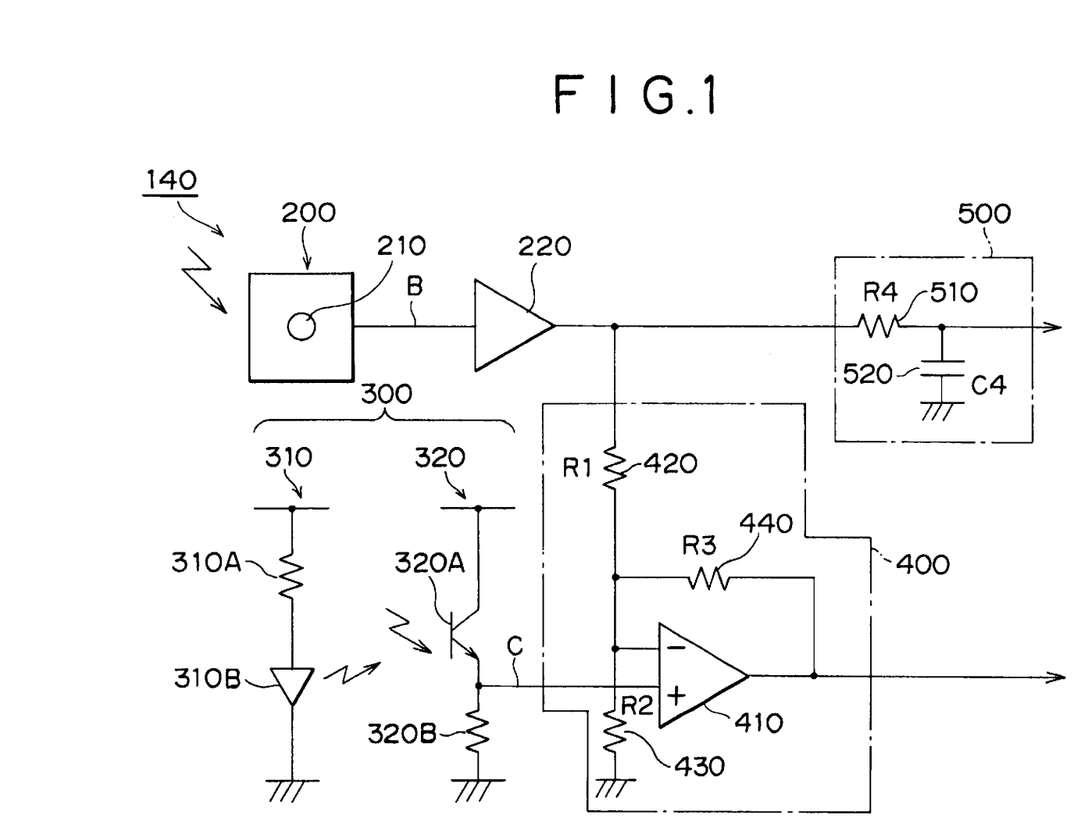
FIG. 1 is a configuration block diagram of a user detection circuit for a display apparatus according to a first embodiment of the present invention.

FIG. 1 is a configuration block diagram of a user detection circuit for a display apparatus according to a first embodiment of the present invention.

Figure 2A:
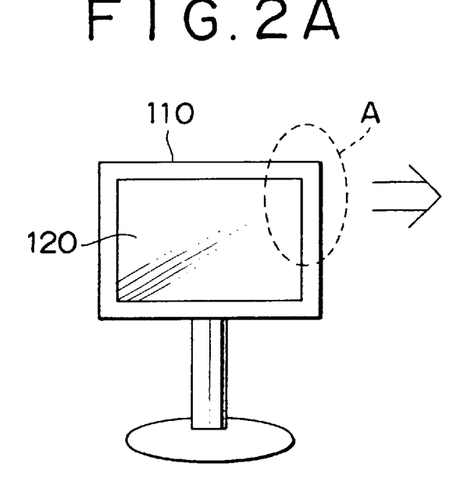
FIGS. 2A and 2B show a display apparatus to be provided with the user detection circuit shown in FIG. 1, FIG. 2A being a front view of the entire apparatus and FIG. 2B being a partially enlarged front view of the apparatus.
Figure 2B:
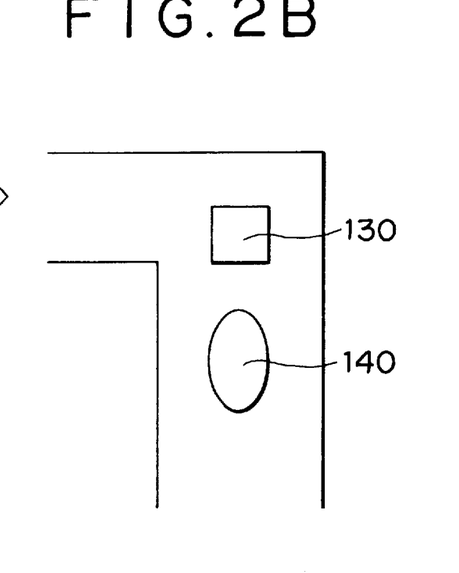

Also, FIGS. 2A and 2B show the outward appearance of a display apparatus to be provided with the user detection circuit shown in FIG. 1. FIG. 2A is a front view of the entire apparatus, and FIG. 2B is a partially enlarged front view of the apparatus.

First, the display apparatus employed in the first embodiment will be described briefly with reference to FIGS. 2A and 2B.

The display apparatus is configured as a flat-panel display apparatus using a backlight type liquid crystal display, for example, and is provided with a transparent liquid crystal panel forming a display screen, backlight disposed in the rear of the transparent liquid crystal panel, and an automatic brightness adjusting function that maintains the backlight at an optimum value according to the brightness of the environment.

As shown in FIG. 2A, the display apparatus is formed by a display screen 120 provided in a rectangular flat panel 110. As shown in FIG. 2B, the display apparatus also has a power supply button 130 and a sensor 140 on the upper right side of the flat panel 110, which is enclosed by a broken line A in the figure. The power supply button 130 is provided to turn on and off the display apparatus, while the sensor 140 includes a light receiving unit 210 of an illumination sensor 200 as well as a light emitting unit 310 and a light receiving unit 320 of a user sensor 300, which are provided in a user detection circuit shown in FIG. 1. The light receiving unit 210 of the illumination sensor 200 detects the brightness of the environment.

The brightness of the environment detected by the illumination sensor 200 is utilized by the brightness adjusting function to automatically adjust the brightness of the backlight, and therefore the brightness of the display screen 120 according to the brightness of the environment.

Figure 3:
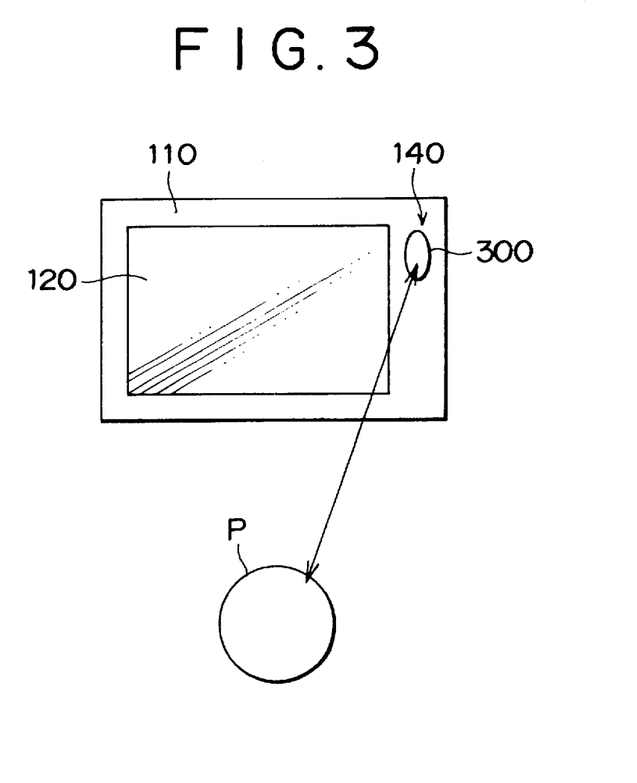
FIG. 3 is a perspective view of a user being detected by a user sensor for the display apparatus shown in FIGS. 2A and 2B.

As shown in FIG. 3, in the sensor 140, infrared rays are emitted from the light emitting unit 310 of the user sensor 300, and the infrared rays reflected from a user P are detected by the light receiving unit 320 of the user sensor 300. Thus, presence or absence of the user P is detected by using a resulting detection level and the like. Here, accurate user detection is made possible by correcting a detection signal of the user sensor 300 using a detection signal of the illumination sensor 200. Then, depending on the presence or absence of the user detected by the user sensor 300, switching between normal operation and standby operation in the display apparatus of the present embodiment is performed.

The configuration of a user detection circuit according to the first embodiment will be described in detail with reference to FIG. 1.

Figure 4A:
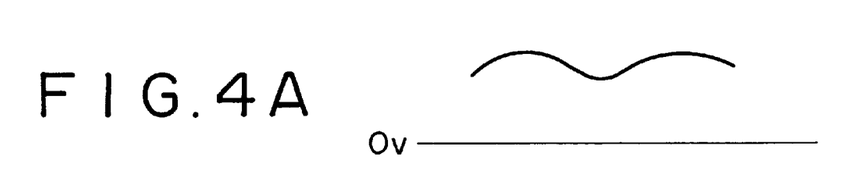
FIGS. 4A and 4B are waveform diagrams of signals from components in a user detection circuit for a display apparatus according to a first embodiment of the present invention.

In the illumination sensor 200, the light receiving unit 210 receives light in the environment of the display apparatus, and a detection signal B in response to the quantity of light is outputted. A waveform example of the detection signal B is shown in FIG. 4A.

It should be noted that an ordinary light sensor can be used for the illumination sensor 200 since light in the environment generally includes both a visible light component and an infrared component.

Then, the detection signal B from the illumination sensor 200 is outputted to a correction circuit 400 and an integration circuit 500 via a buffer circuit 220.

The user sensor 300 is a reflection type infrared sensor with the light emitting unit 310 and the light receiving unit 320.

The light emitting unit 310 has a resistance 310A and an infrared diode 310B, and emits infrared rays from the infrared diode 310B to the front of the display apparatus. On the other hand, the light receiving unit 320 has a phototransistor 320A and a resistance 320B, and the phototransistor 320A has frequency characteristics to detect the infrared rays.

Figure 4B:
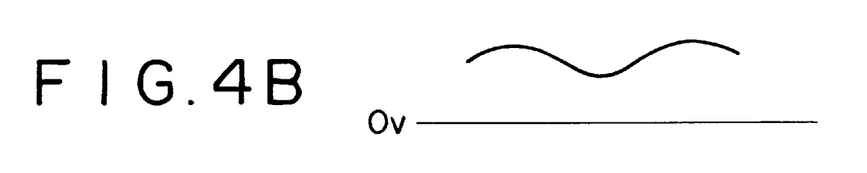

In the light receiving unit 320, the phototransistor 320A receives the infrared rays which are emitted from the infrared diode 310B of the light emitting unit 310 and reflected from the user, and a detection signal C in response to the quantity of light is outputted to the correction circuit 400. A waveform example of the detection signal C of the user sensor 300 is shown in FIG. 4B.

The correction circuit 400 has a differential amplifier 410 and resistances 420, 430, and 440. A detection voltage of the phototransistor 320A is inputted to the positive input terminal of the differential amplifier 410, while a detection voltage of the illumination sensor 200 outputted from the buffer circuit 220 is divided by the resistances 420 and 430, and then inputted to the negative input terminal of the differential amplifier 410. The output terminal of the differential amplifier 410 is also connected to the negative input terminal of the differential amplifier 410 via the resistance 440.

In the case of the correction circuit 400 having such a configuration, part of the detection voltage from the phototransistor 320A is cancelled out in the differential amplifier 410 by the detection voltage from the illumination sensor 200, and a resulting voltage is outputted to a user determination circuit in the next stage (not shown in the figure) as a corrected voltage signal.

Thus, the quantity of infrared rays that are included in the environmental light entering the user sensor 300 is cancelled out by the quantity of infrared rays that are included in the environmental light detected by the illumination sensor 200, thereby providing a sensor output representing correct user detection. Incidentally, the resistance 420 is provided to optimize the amount of voltage cancelled out by the detection signal from the illumination sensor 200, and an optimum resistance value is selected for the resistance based on the proportion of infrared rays included in the environmental light and the like. In addition, the resistances 430 and 440 determine the amplification factor of the differential amplifier 410.

On the other hand, the integration circuit 500 has a resistance 510 and a capacitor 520, and integrates the detection voltage from the illumination sensor 200 to supply the result to a brightness adjusting circuit in the next stage (not shown in the figure). This means that in the present embodiment, the detection signal from the illumination sensor 200 for brightness adjustment also serves as a cancellation signal to be supplied to the correction circuit for user detection, thereby making it possible to reduce the number of parts.

By effectively using the output from the illumination sensor 200 provided for brightness adjustment, the user detection circuit as described above accurately corrects the detection signal from the user sensor 300 without performing sample hold or timing synchronization as described above with respect to the conventional circuit. Thus, it is possible to perform accurate user detection by means of reflected infrared light with a simple configuration.

Next, a second embodiment of the present invention will be described.

In the first embodiment described above, the light emitting unit 310 of the user sensor 300 is set to provide continuous lighting. In a user detection circuit according to the second embodiment, on the other hand, the light emitting unit 310 of the user sensor 300 is made to provide pulsed lighting so that only an alternating-current component is detected.

Figure 5:
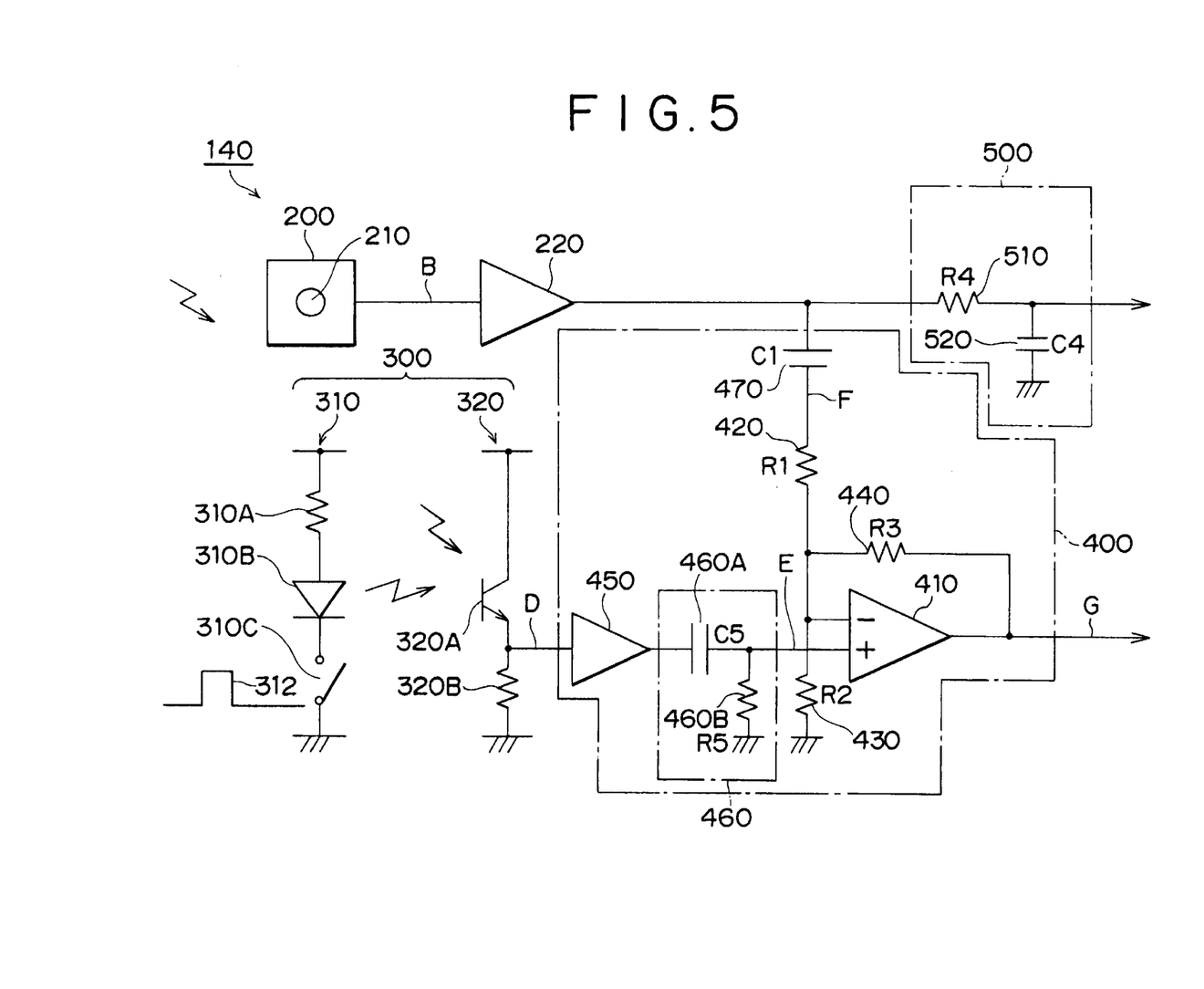
FIG. 5 is a configuration block diagram of a user detection circuit for a display apparatus according to a second embodiment of the present invention.

FIG. 5 is a configuration block diagram of a user detection circuit for a display apparatus according to the second embodiment of the present invention. Incidentally, common components with FIG. 1 are identified by the same reference numerals.

In the user detection circuit, the light emitting unit 310 of the user sensor 300 is provided with a switch 310C to allow an infrared diode 310B to provide pulsed lighting. The infrared diode 310B is turned on and off by supplying a pulse 312 to the switch 310C from a pulse generating circuit (not shown in the figure). Thus, infrared pulsed lighting is obtained.

Figure 6A:
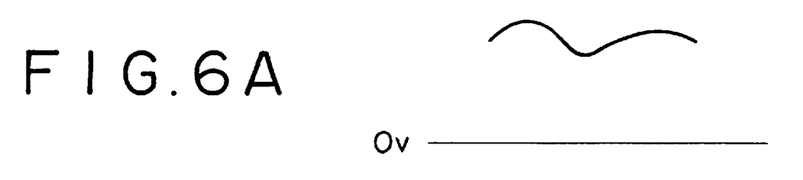
FIGS. 6A to 6E are waveform diagrams of signals from components in a user detection circuit for a display apparatus according to a second embodiment of the present invention.
Figure 6B:
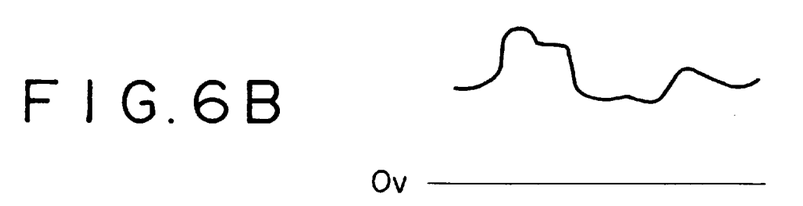

As a result of the pulsed lighting of the infrared diode 310B as described above, a detection signal D having a waveform as shown in FIG. 6B is outputted from a phototransistor 320A in the light receiving unit 320 of the user sensor 300. Incidentally, the frequency of the pulsed lighting is set at about 30 Hz, for example.

As shown in FIG. 6A, the waveform of a detection signal B outputted from an illumination sensor 200 is the same as in the first embodiment.

Then, the detection signal D from the phototransistor 320A is inputted to a filter circuit 460, which is formed by a capacitor 460A and a resistance 460B, via a buffer circuit 450.

Figure 6C:
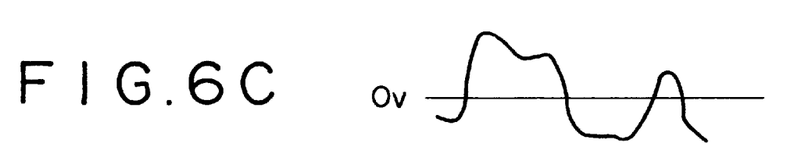

The filter circuit 460 removes a direct-current component included in the detection signal D from the phototransistor 320A and inputs only an alternating-current component to the positive input terminal of an amplifier 410. FIG. 6C shows a waveform example of a signal E outputted from the filter circuit 460 in which its direct-current component is cut off. Incidentally, the cutoff frequency of the filter circuit 460 is set at about 1 Hz, for example.

Figure 6D:
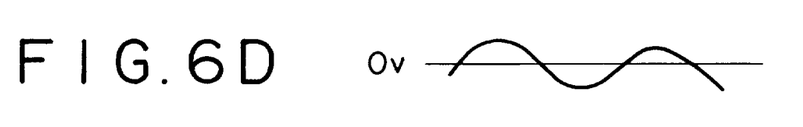

On the other hand, a capacitor 470 is provided in front of a resistance 420 to be supplied with a detection signal of the illumination sensor 200. The capacitor 470 removes a direct-current component included in a detection signal from the illumination sensor 200 and inputs only an alternating-current component to the negative input terminal of the amplifier 410 via the resistance 420. Incidentally, FIG. 6D shows a waveform example of a detection signal F outputted from the capacitor 470 in which its direct-current component is cut off.

Figure 6E:
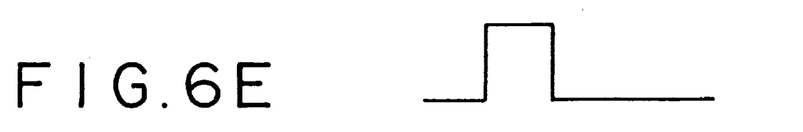

The output of the amplifier 410, to which a signal containing only an alternating-current component as described above is inputted, is provided as a pulsed signal G containing a high proportion of high-frequency components. The pulsed signal is then supplied to a user determination circuit to detect presence or absence of the user based on the presence or absence of the pulse. FIG. 6E shows a waveform example of the pulsed signal G outputted from the amplifier 410.

The configuration described above according to the second embodiment provides the following advantages.

Specifically, when continuous infrared lighting is used as in the first embodiment described above, it may be difficult to allow direct-current components to completely cancel out each other because of the difference in sensitivity between the user sensor 300 and the illumination sensor 200. Thus, as described in the second embodiment, the difference between the direct-current components can be eliminated completely by allowing the user sensor 300 to provide pulsed infrared lighting and allowing the capacitors 460A and 470 to cut off the direct-current components of detection signals from the user sensor 300 and the illumination sensor 200.

In addition, the resistance 420 may be set by considering only cancellation of alternating-current components. Therefore, the resistance 420 may be adjusted in such a manner that the frequency components of commercial power supply at 50 Hz or 60 Hz, which generally have the greatest effects, cancel out each other. This means that alternating-current components of environmental light can also optimally cancel out each other.

Thus, according to the second embodiment, it is possible to further improve the accuracy of user detection. In the second embodiment, circuit components are increased as compared with the first embodiment; however, a timing circuit or a sample hold circuit as used in the above conventional circuit is not required. Thus, the second embodiment can be realized with a simple configuration as compared with the conventional circuit configuration described above.

It should be noted that in the first and second embodiments described above, a backlight type liquid crystal display apparatus is taken as an example; however, the present invention is similarly applicable to various types of display apparatus provided with power-off mode.

It should also be noted that the illumination sensor to be used for the present invention does not necessarily need to be an illumination sensor for brightness adjustment, and therefore it is possible to perform the same control by using a different sensor.

While a preferred embodiment of the present invention has been described using specific terms, such description is for illustrative purposes only, and it is to be understood that changes and variations may be made without departing from the spirit or scope of the following claims.

What is claimed is:

1. A user detection circuit for a display apparatus that detects an absence of a user and that switches from a normal operation to a power-saving standby operation to allow the display apparatus to suspend displaying and enter a standby mode, comprising:

a user sensor for detecting the user in front of a display screen;

an illumination sensor for detecting a brightness of an environment of the display screen;

correction means for correcting a detection signal of the user sensor based on a detection signal of the illumination sensor; and determination means for determining whether the user is present based on the signal corrected by the correction means, wherein switching between the normal operation and the power-saving standby operation of the display apparatus is performed based on a result of a determination by the determination means, and wherein the correction means is a subtraction means for subtracting a signal generated when a direct-current component in the detection signal of the illumination sensor is interrupted and when a direct-current component included in the detection signal of the user sensor is interrupted.

2. The user detection circuit as claimed in claim 1, further comprising switch means for driving the user sensor in an alternating manner.

3. The user detection circuit as claimed in claim 1, wherein the user sensor is a reflection-type infrared detection sensor.

4. The user detection circuit as claimed in claim 1, wherein the illumination sensor is used as a sensor for adjusting a brightness of the display apparatus.

5. The user detection circuit as claimed in claim 4, wherein a detection voltage signal of the illumination sensor is integrated by an integration circuit, and a brightness of the display screen is adjusted based on a level of output voltage of the integration circuit.

* * * * *